US012618262B2

(12) United States Patent
Shaw et al.

(10) Patent No.: US 12,618,262 B2
(45) Date of Patent: May 5, 2026

(54) AUTOMOTIVE ELEMENT THEFT PREVENTION DEVICE

(71) Applicants: Mavis Shaw, Edmonton (CA); Tamara Dolinsky, Edmonton (CA)

(72) Inventors: Mavis Shaw, Edmonton (CA); Tamara Dolinsky, Edmonton (CA)

( * ) Notice: Subject to any disclaimer, the term of this patent is extended or adjusted under 35 U.S.C. 154(b) by 479 days.

(21) Appl. No.: 18/169,933

(22) Filed: Feb. 16, 2023

(65) Prior Publication Data

US 2024/0279959 A1 Aug. 22, 2024

(51) Int. Cl.
*E04H 17/18* (2006.01)
*B60R 25/09* (2013.01)

(52) U.S. Cl.
CPC ............. *E04H 17/18* (2013.01); *B60R 25/09* (2013.01)

(58) Field of Classification Search
CPC ....... E04H 17/16; E04H 17/18; E04H 17/185; B60R 25/09; B60R 25/093
USPC .......................................................... 70/237
See application file for complete search history.

(56) References Cited

U.S. PATENT DOCUMENTS

| | | | | |
|---|---|---|---|---|
| 4,312,452 A * | 1/1982 | Waier | ...................... | B60R 25/00 211/208 |
| 4,437,697 A * | 3/1984 | Hinojos | .................. | B60R 13/04 293/118 |
| 5,035,458 A * | 7/1991 | Boensch | ................. | B60R 25/00 280/748 |
| 5,314,040 A * | 5/1994 | Rivera | .................. | B60R 25/104 70/237 |
| 6,349,573 B1 * | 2/2002 | Johnson | .................. | B60R 25/00 70/101 |
| 6,513,852 B1 * | 2/2003 | Krist | ......................... | B60J 5/108 296/50 |
| 11,530,558 B2 * | 12/2022 | Grant | .................... | E05C 19/003 |

* cited by examiner

*Primary Examiner* — Nathan Cumar
(74) *Attorney, Agent, or Firm* — Orin Del Vecchio

(57) ABSTRACT

An anti-theft device configured to be installed around at least a portion of the perimeter of the vehicle wherein the present invention inhibits access to the area underneath the vehicle. The anti-theft device includes a first rail member and a second rail member that are identically constructed and deployed on opposing sides of the vehicle. The first rail member and second rail member include upper longitudinal support members and lower longitudinal support members. A plurality of vertical support members are intermediate the upper and lower longitudinal support members having a void therebetween of sufficient size to inhibit a human from traversing therethrough. The present invention can further be deployed with front and rear rail members built similarly to the first and second rail members. Tire platforms are hingedly secured to the first and second rail members and are configured to have tires of a vehicle superposed thereto.

21 Claims, 3 Drawing Sheets

100

75

99

98

97

70

AUTOMOTIVE ELEMENT THEFT PREVENTION DEVICE

FIELD OF THE INVENTION

The present invention relates generally to anti-theft devices for vehicles, more specifically but not by way of limitation, an anti-theft device for a vehicle wherein the device of the present invention inhibits an ability to access underneath the vehicle and as such prevent theft of the catalytic convertor of the vehicle.

BACKGROUND

A catalytic converter is an exhaust emission control device that converts toxic gases and pollutants in exhaust gas from an internal combustion engine into less-toxic pollutants by catalyzing a redox reaction. Catalytic converters are usually used with internal combustion engines. The first widespread introduction of catalytic converters was in the United States automobile market. To comply with the EPA regulation of exhaust emissions, most gasoline-powered vehicles starting with vehicles produced in 1975 are now equipped with catalytic converters. These converters combined oxygen with carbon monoxide and unburned hydrocarbons to produce carbon dioxide and water. These stringent emission control regulations forced the removal of the antiknock agent tetraethyl lead from automotive gasoline, to reduce lead in the air. Requiring the removal of lead allowed the use of catalytic converters to meet the other emission standards in the regulations.

The catalytic converter includes a portion that is a mix of precious metals from the platinum group. Platinum is the most active catalyst and is widely used, but is not suitable for all applications. Palladium and rhodium are two other precious metals used. Rhodium is used as a reduction catalyst, palladium is used as an oxidation catalyst, and platinum is used both for reduction and oxidation. The cost of the aforementioned precious metals utilized in the manufacturing of catalytic converters has resulted in a dramatic increase in the theft of catalytic convertors. According to the recent crime statistics, the average number of catalytic converter thefts per month rose from 108 in 2018 to 1,203 in 2020. Platinum, palladium, and rhodium are usually worth more than gold. In 2021 when rhodium was worth a little under thirty thousand dollars per troy ounce. To date, there are no real effective solutions to prevent theft of catalytic convertors.

Accordingly, there is a need for an anti-theft device that can be releasably coupled to a vehicle that is operable to inhibit theft of the catalytic convertor of the vehicle.

SUMMARY OF THE INVENTION

It is the object of the present invention to provide an anti-theft device for a vehicle that is operable to inhibit theft of a catalytic convertor wherein the present invention includes a first rail member.

Another object of the present invention is to provide a device that inhibits access underneath a parked vehicle wherein the first rail member includes a first tire platform and a second tire platform at opposing ends thereof.

A further object of the present invention is to provide an anti-theft device for a vehicle that is operable to inhibit theft of a catalytic convertor wherein the present invention includes a second rail member that is located on the opposing side of the vehicle from the first rail member.

Yet a further object of the present invention is to provide a device that inhibits access underneath a parked vehicle wherein the second rail member includes a first tire platform and a second tire platform secured to opposing ends thereof.

Still another object of the present invention is to provide an anti-theft device for a vehicle that is operable to inhibit theft of a catalytic convertor wherein the first rail member and the second rail member further include wheel lock members.

An additional object of the present invention is to provide a device that inhibits access underneath a parked vehicle wherein the present invention can further include a front rail member and a rear rail member.

Yet a further object of the present invention is to provide an anti-theft device for a vehicle that is operable to inhibit theft of a catalytic convertor wherein the first rail member and the second rail member are configured to either fold or telescopically reduce in size for storage thereof when not in use.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
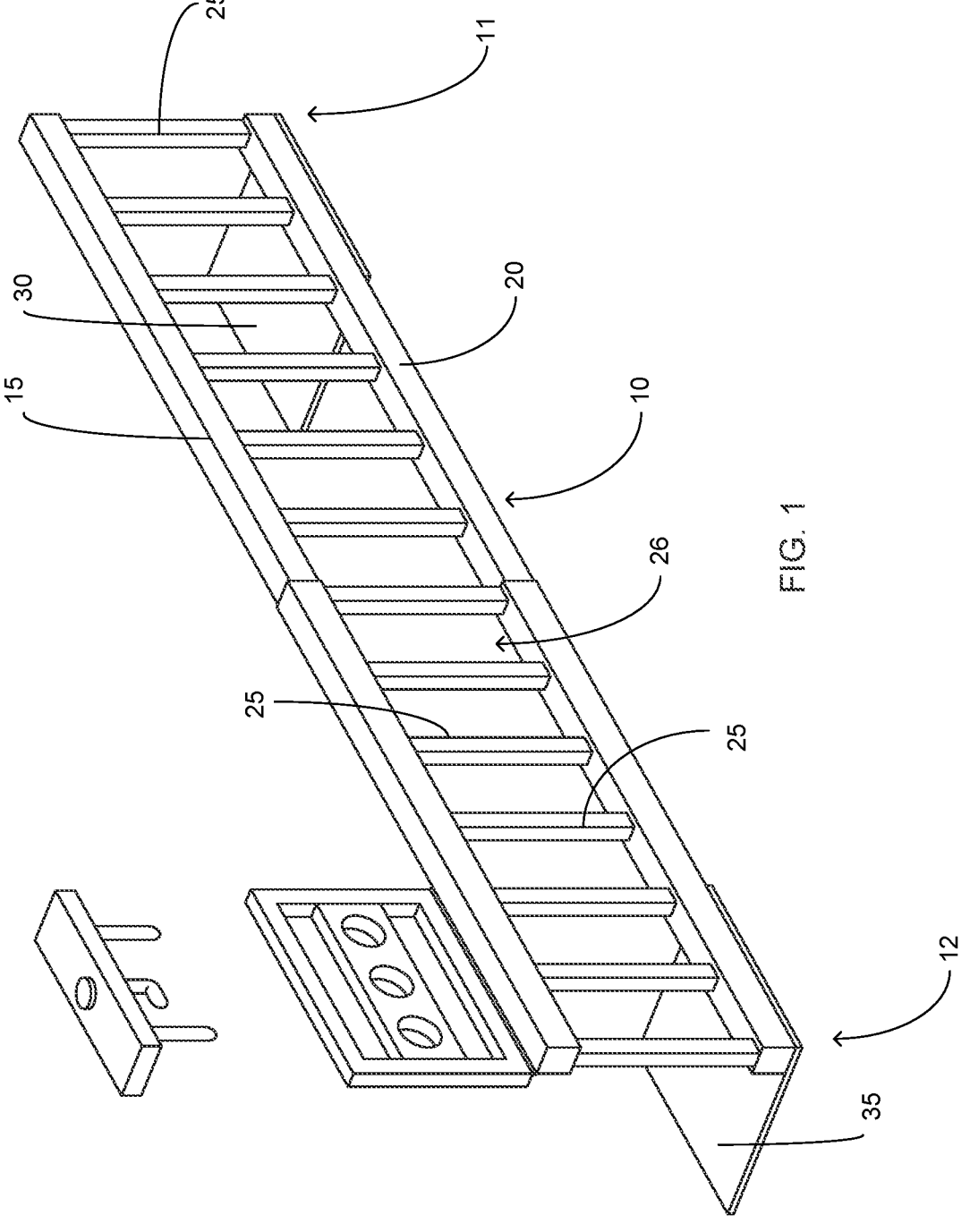
FIG. 1 is a perspective view of a rail member of the present invention.

Referring now to the drawings submitted herewith, wherein various elements depicted therein are not necessarily drawn to scale and wherein through the views and figures like elements are referenced with identical reference numerals, there is illustrated a vehicle anti-theft device 100 constructed according to the principles of the present invention.

An embodiment of the present invention is discussed herein with reference to the figures submitted herewith. Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Referring in particular to the Figures submitted herewith, the anti-theft device 100 includes a first rail member 10. The first rail member 10 is manufactured from a rigid lightweight material such as but not limited to metal. The first rail member 10 includes a first end 11 and second end 12. It should be understood within the scope of the present invention that the first rail member 10 is configured to be transitioned from a folded state to an deployed state as is illustrated herein. The folded state allows for storage of the first rail member 10 in a place such as but not limited to the trunk of a vehicle. It is contemplated within the scope of the present invention that the first rail member 10 could be configured to be telescoping or have hinged sections in order to facilitate transition between a folded state and a deployed state. It should be further understood within the scope of the present invention that the first rail member 10 could be provided in alternate lengths in order to accommodate vehicles of different sizes.

The first rail member 10 includes an upper longitudinal support member 15 and a lower longitudinal support member 20. The upper longitudinal support member 15 and lower longitudinal support member 20 are parallel having a plurality of vertical support members 25 therebetween. The vertical support members 25 are secured to the upper longitudinal support member 15 and the lower longitudinal support member 20 utilizing suitable durable techniques. It is contemplated within the scope of the present invention that first rail member 10 could have alternate quantities of vertical support members 25 wherein the intended scope is to provide a sufficient quantity so as to inhibit a human from being able to traverse through the void 26 present between the vertical support members 25. While vertical support members 25 are illustrated herein, it is contemplated within the scope of the present invention that alternate configurations thereof could be provided in order to achieve the desired objective of inhibiting a human from traversing therepast. It should be understood within the scope of the present invention that the first rail member 10 has a height that inhibits access underneath the vehicle 99 and further permits full functionality of the door of the vehicle 99 so as to avoid inhibiting access to the interior of the vehicle 99.

The first rail member 10 includes a first tire platform 30 wherein the first tire platform 30 is proximate first end 11. A second tire platform 35 is secured to the first rail member 10 proximate the second end 12. Both the first tire platform

Figure 3:
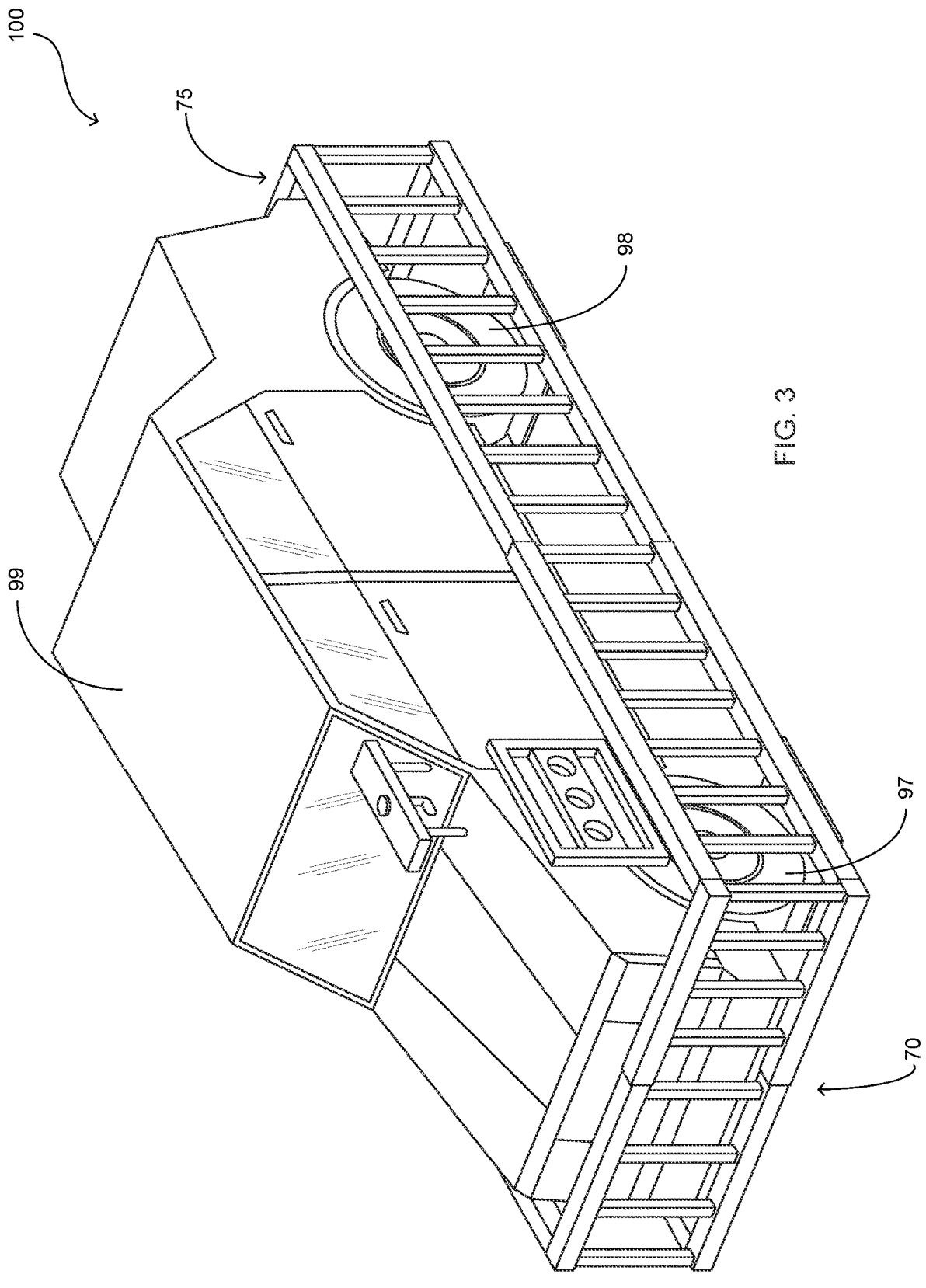
FIG. 3 is a perspective side view of an exemplary installation of the present invention.

30 and second tire platform 35 are hingedly secured to the first rail member 10 so as to fold up thereagainst for storage of the first rail member 10 when not in use. The first tire platform 30 and second tire platform 35 are identically manufactured being manufactured from a metal plate or other suitable durable material. The first tire platform 30 and second tire platform 35 are operable to have the front and rear tires 97,98 of the exemplary car 99 superposed thereon when the anti-theft device 100 is deployed as is illustrated herein in FIG. 3. The weight of the vehicle 99 inhibits movement of the first rail member 10 ensuing tires 97,98 being superposed the first tire platform 30 and second tire platform 35. It is contemplated within the scope of the present invention that the first tire platform 30 and second tire platform 35 could be provided in alternate sizes.

The anti-theft device 100 further includes a second rail member 40. The second rail member 40 is manufactured from a rigid lightweight material such as but not limited to metal. The second rail member 40 includes a first end 41 and second end 42. It should be understood within the scope of the present invention that the second rail member 40 is configured to be transitioned from a folded state to an deployed state as is illustrated herein. The folded state allows for storage of the second rail member 40 in a place such as but not limited to the trunk of a vehicle. It is contemplated within the scope of the present invention that the second rail member 40 could be configured to be telescoping or have hinged sections in order to facilitate transition between a folded state and a deployed state. It should be further understood within the scope of the present invention that the second rail member 40 could be provided in alternate lengths in order to accommodate vehicles of different sizes.

The second rail member 40 includes an upper longitudinal support member 45 and a lower longitudinal support member 50. The upper longitudinal support member 45 and lower longitudinal support member 50 are parallel having a plurality of vertical support members 55 therebetween. The vertical support members 55 are secured to the upper longitudinal support member 45 and the lower longitudinal support member 50 utilizing suitable durable techniques. It is contemplated within the scope of the present invention that second rail member 40 could have alternate quantities of vertical support members 55 wherein the intended scope is to provide a sufficient quantity so as to inhibit a human from being able to traverse through the void 56 present between the vertical support members 55. While vertical support members 55 are illustrated herein, it is contemplated within the scope of the present invention that alternate configurations thereof could be provided in order to achieve the desired objective of inhibiting a human from traversing therepast. It should be understood within the scope of the present invention that the second rail member 40 has a height that inhibits access underneath the vehicle 99 and further permits full functionality of the door of the vehicle 99 so as to avoid inhibiting access to the interior of the vehicle 99.

The second rail member 40 includes a first tire platform 60 wherein the first tire platform 60 is proximate first end 41. A second tire platform 65 is secured to the second rail member 40 proximate the second end 42. Both the first tire platform 60 and second tire platform 65 are hingedly secured to the second rail member 40 so as to fold up thereagainst for storage of the second rail member 40 when not in use. The first tire platform 60 and second tire platform 65 are identically manufactured being manufactured from a metal plate or other suitable durable material. The first tire platform 60 and second tire platform 65 are operable to have the front and rear tires 97,98 of the exemplary car 99 superposed thereon when the anti-theft device 100 is deployed as is illustrated herein in FIG. 3. The weight of the vehicle 99 inhibits movement of the second rail member 40 ensuing tires 97,98 being superposed the first tire platform 60 and second tire platform 65. It is contemplated within the scope of the present invention that the first tire platform 60 and second tire platform 65 could be provided in alternate sizes.

The anti-theft device 100 further includes a front rail member 70 and rear rail member 75. Front rail member 70 and rear rail member 75 are adjacent the front of the vehicle 99 and rear of the vehicle 99 respectively when the anti-theft device 100 has been deployed. The front rail member and rear rail member 75 are manufactured identically as the first rail member 10 and second rail member 40 as is described herein. It should be understood that the front rail member 70 and rear rail member 75 are operably coupled to the first rail member 10 and second rail member 40 utilizing suitable mechanical fasteners or other suitable techniques. It should be further understood within the scope of the present invention that the anti-theft device 100 could be deployed with or without the front rail member 70 and rear rail member 75.

Figure 2:
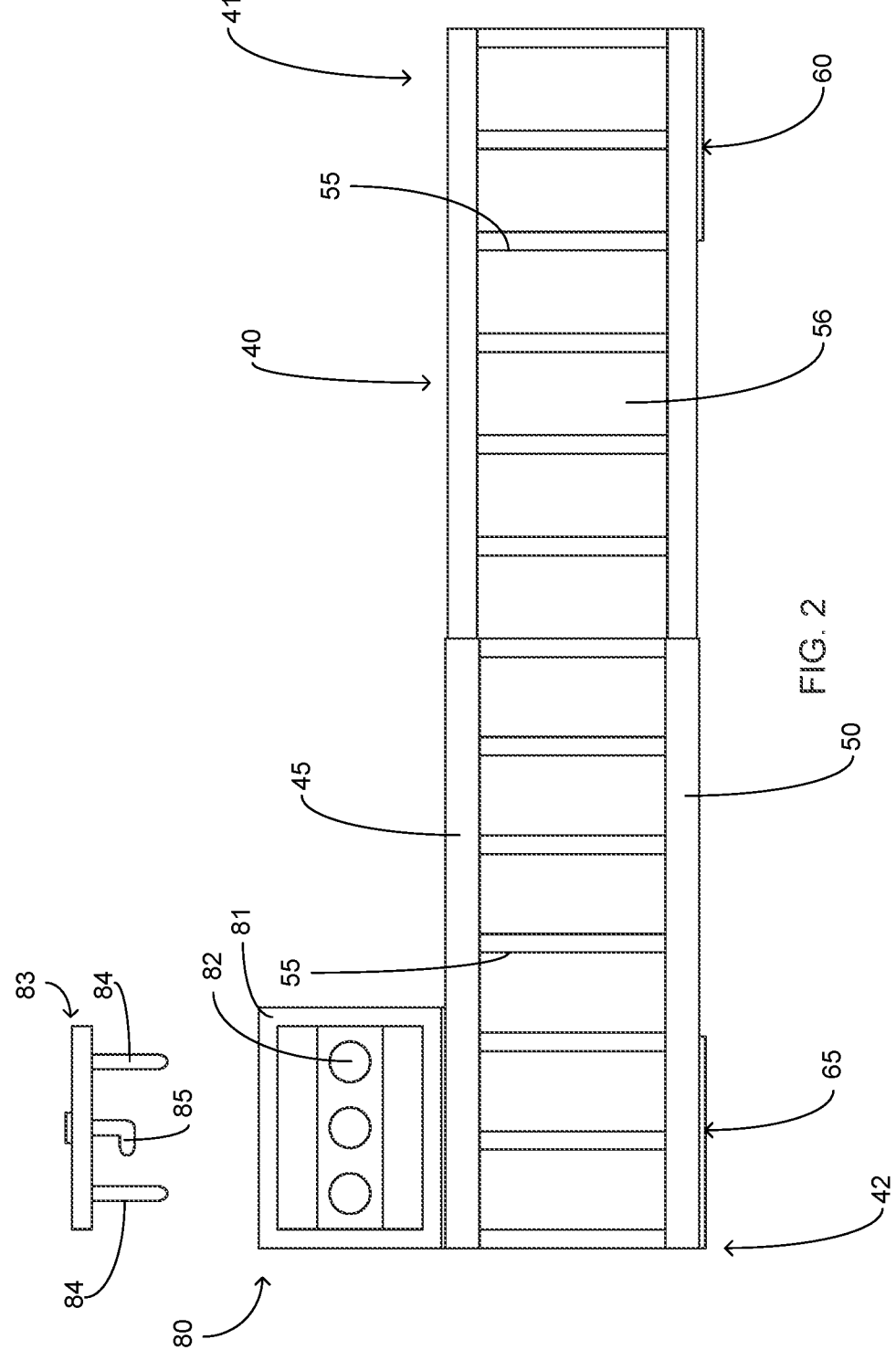
FIG. 2 is a side view of a rail member of the present invention.

The anti-theft device 100 further includes a wheel lock member 80. The wheel lock member 80 is configured to releasably secure to the wheel of the vehicle 99. The wheel lock member 80 includes plate member 81 that is hingedly secured to the second rail member 40, as is illustrated in FIG. 2. It should be understood within the scope of the present invention that the first rail member 10 also has a wheel lock member 80 as described herein. The plate member 81 includes apertures 82 that are configured to have pins 84 of securing member 83 journaled thereinto. Rotating pin 85 is operable to facilitate coupling of the wheel lock member 80 to a wheel of the vehicle. The pins 84 are designed to be placed in various voids of hubcaps and/or wheels so as to operably couple therewith. It should be understood within the scope of the present invention that the wheel lock member 80 could be constructed in numerous alternate manners and achieve the desired objective of releasably securing to a wheel and/or hubcap of the vehicle 99. The pins further inhibit the vehicle 99 from being driven or rolled as the pins 84 are engaged with the wheel and the plate member 81. It should be understood within the scope of the present invention that the anti-theft device 100 could be provided with only the wheel lock member 80 and not be equipped with the tire platforms as discussed herein. Conversely, the anti-theft device 100 could be provided with both the wheel lock member 80 and the tire platforms and have alternate quantities of each.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding detailed description is, therefore, not intended to be limited to the specific forms set forth herein, but on the contrary, it is intended to cover such alternatives, modifications, and equivalents, as can be reasonably included within the spirit and scope of the appended claims.

What is claimed is:

1. An anti-theft device that inhibits access to an area underneath a vehicle wherein the anti-theft device comprises:
   a first rail member, said first rail member being disposed on a first side of the vehicle, said first rail member extending between a front end and a rear end of the vehicle, said first rail member having a height that extends to a floorboard of the vehicle;
   a second rail member, said second rail member being disposed on a second side of the vehicle, said second rail member extending between the front end and the rear end of the vehicle, said second rail member having a height that extends to the floorboard of the vehicle; and
   wherein said first rail member and said second rail member are releasably secured in place and configured to inhibit access to the area underneath the vehicle, and
   wherein said first rail member includes one of an upper longitudinal support member and a lower longitudinal support member, said longitudinal support member being parallel to the floorboard of the vehicle.

2. The anti-theft device that inhibits access to the area underneath the vehicle as recited in claim 1, wherein said first rail member further includes an other of said upper longitudinal support member and said lower longitudinal support member, with said upper longitudinal support member and said lower longitudinal support member being parallel.

3. The anti-theft device that inhibits access to the area underneath the vehicle as recited in claim 2, wherein said first rail member further includes a plurality of vertical support members, said vertical support members being intermediate said upper longitudinal support member and a lower longitudinal support member and further being perpendicular thereto.

4. The anti-theft device that inhibits access to the area underneath the vehicle as recited in claim 3, wherein said plurality of vertical support members have a void therebetween.

5. The anti-theft device that inhibits access to the area underneath the vehicle as recited in claim 4, and further including a front rail member, said front rail member operable to be disposed adjacent a front of the vehicle.

6. The anti-theft device that inhibits access to the area underneath the vehicle as recited in claim 5, and further including a rear rail member, said rear rail member configured to be disposed adjacent a rear of the vehicle.

7. The anti-theft device that inhibits access to the area underneath the vehicle as recited in claim 6, wherein said first rail member includes a first tire platform and a second tire platform, said first tire platform and said second tire platform being operably coupled to said lower longitudinal support member of said first rail member, said first tire platform and said second tire platform configured to have tires on the first side of the vehicle superposed thereon.

8. The anti-theft device that inhibits access to the area underneath the vehicle as recited in claim 7, wherein said second rail member includes a first tire platform and a second tire platform, said first tire platform and said second tire platform of said second rail member being operably coupled to said lower longitudinal support member of said second rail member, said first tire platform and said second tire platform of said second rail member being configured to have tires on the passenger side of the vehicle superposed thereon.

9. An anti-theft device that inhibits access to an area underneath a vehicle wherein the anti-theft device comprises:

a first rail member, said first rail member being disposed on a driver's side of the vehicle, said first rail member extending between a front end and a rear end of the vehicle, said first rail member having a height that extends to a floorboard of the vehicle, said first rail member having a first end and a second end, said first rail member having an upper longitudinal support member and a lower longitudinal support member, said lower longitudinal support member being superposed on a ground surface adjacent the vehicle, said upper longitudinal support member and said lower longitudinal support member being parallel and having a void therebetween, said first rail member having a plurality of vertical support members extending between said upper longitudinal support member and said lower longitudinal support member and being perpendicular thereto;

a second rail member, said second rail member being disposed on a passenger side of the vehicle, said second rail member extending between the front end and the rear end of the vehicle, said second rail member having a height that extends to the floorboard of the vehicle, said second rail member having a first end and a second end, said second rail member having an upper longitudinal support member and a lower longitudinal support member, said lower longitudinal support member of said second rail member being superposed on a ground surface adjacent the vehicle, said upper longitudinal support member and said lower longitudinal support member of said second rail member being parallel and having a void therebetween, said second rail member having a plurality of vertical support members extending between said upper longitudinal support member and said lower longitudinal support member of said second rail member and being perpendicular thereto.

10. The anti-theft device that inhibits access to the area underneath the vehicle as recited in claim 9, wherein said first rail member further includes a first tire platform, said first tire platform being operably coupled to said first end of said first rail member, said first tire platform being perpendicular to said first rail member extending outward therefrom, said first tire platform configured to have a tire of the vehicle superposed thereon.

11. The anti-theft device that inhibits access to the area underneath the vehicle as recited in claim 10, wherein said first rail member further includes a second tire platform, said second tire platform being operably coupled to said second end of said first rail member, said second tire platform being perpendicular to said first rail member extending outward therefrom, said second tire platform configured to have a tire of the vehicle superposed thereon.

12. The anti-theft device that inhibits access to the area underneath the vehicle as recited in claim 11, wherein said second rail member further includes a first tire platform, said first tire platform of said second rail member being operably coupled to said first end of said second rail member, said first tire platform of said second rail member being perpendicular to said second rail member extending outward therefrom, said first tire platform of said second rail member configured to have a tire of the vehicle superposed thereon.

13. The anti-theft device that inhibits access to the area underneath the vehicle as recited in claim 12, wherein said second rail member further includes a second tire platform, said second tire platform of said second rail member being operably coupled to said second end of said second rail member, said second tire platform of said second rail member being perpendicular to said second rail member extending outward therefrom, said second tire platform of said second rail member configured to have a tire of the vehicle superposed thereon.

14. The anti-theft device that inhibits access to the area underneath the vehicle as recited in claim 13, wherein the anti-theft device further includes at least one wheel lock member, said at least one wheel lock member configured to releasably secure to a wheel of the vehicle.

15. An anti-theft device that inhibits access to an area underneath a vehicle wherein the anti-theft device comprises:

a first rail member, said first rail member being disposed on a first side of the vehicle, said first rail member extending between a front end and a rear end of the vehicle, said first rail member having a height that extends to a floorboard of the vehicle;

a second rail member, said second rail member being disposed on a second side of the vehicle, said second rail member extending between the front end and the rear end of the vehicle, said second rail member having a height that extends to the floorboard of the vehicle; and a front rail member, said front rail member operable to be disposed adjacent a front of the vehicle, wherein said first rail member and said second rail member are releasably secured in place and configured to inhibit access to the area underneath the vehicle.

16. The anti-theft device as recited in claim 15, and further including a rear rail member, said rear rail member configured to be disposed adjacent a rear of the vehicle.

17. The anti-theft device as recited in claim 16, wherein said first rail member includes a first tire platform and a second tire platform, said first tire platform and said second tire platform being operably coupled to said lower longitudinal support member of said first rail member, said first tire platform and said second tire platform configured to have tires on the first side of the vehicle superposed thereon.

18. The anti-theft device as recited in claim 17, wherein said second rail member includes a first tire platform and a second tire platform, said first tire platform and said second tire platform of said second rail member being operably coupled to said lower longitudinal support member of said second rail member, said first tire platform and said second tire platform of said second rail member being configured to have tires on the passenger side of the vehicle superposed thereon.

19. The anti-theft device as recited in claim 18, wherein said first rail member includes an upper longitudinal support member and a lower longitudinal support member, said upper longitudinal support member and said lower longitudinal support member being parallel.

20. The anti-theft device as recited in claim 19, wherein said first rail member further includes a plurality of vertical support members, said vertical support members being intermediate said upper longitudinal support member and a lower longitudinal support member and further being perpendicular thereto.

21. The anti-theft device as recited in claim 20, wherein said plurality of vertical support members have a void therebetween.

* * * * *